Dec. 10, 1968 MASUSABURO TAKAGI ET AL 3,416,136

SIGNAL SELECTION SYSTEM

Filed Oct. 12, 1964 5 Sheets-Sheet 1

INVENTORS
MASUSABURO TAKAGI AND
SHIGEO KUBOTA
By Linton and Linton
ATTORNEYS

INVENTOR
MASUSABURO TAKAGI AND
SHIGEO KUBOTA
By Linton and Linton
ATTORNEYS

INVENTORS
MASUSABURO TAKAGI AND
SHIGEO KUBOTA
By Linton and Linton
ATTORNEYS

SIGNAL SELECTION SYSTEM

Filed Oct. 12, 1964

INVENTORS
MASUSABURO TAKAGI AND
SHIGEO KUBOTA
By Linton and Linton
ATTORNEYS

INVENTORS
MASUSABURO TAKAGI AND
SHIGEO KUBOTA
By Linton and Linton
ATTORNEYS

United States Patent Office
3,416,136
Patented Dec. 10, 1968

3,416,136
SIGNAL SELECTION SYSTEM
Masusaburo Takagi, No. 147–20, Hiro-machi, Nakano-ku Tokyo, and Shigeo Kubota, No. 51–206 Kodanjutaku Maehara Danchi, Maehara, Funabashi-shi, Chiba-ken, Japan
Filed Oct. 12, 1964, Ser. No. 403,250
Claims priority, application Japan, June 17, 1964, 39/33,999
8 Claims. (Cl. 340—172)

ABSTRACT OF THE DISCLOSURE

A signal selection system is provided for use in code translating apparatus or facsimile equipment of the type employed in telex and teleprinting communications. The system is in network or matrix form, comprising switching means operating according to the coded input, a plurality of circuits each consisting essentially of diodes and an output element, and two sources of signal, AC and DC, for selectively energizing the circuits in such a manner that an AC output signal is made available from an output element determined by the preset translating schedule, thus translating the coded input into an output signal for printing out letters to spell out the information which have been coded in the input.

Figure 2:
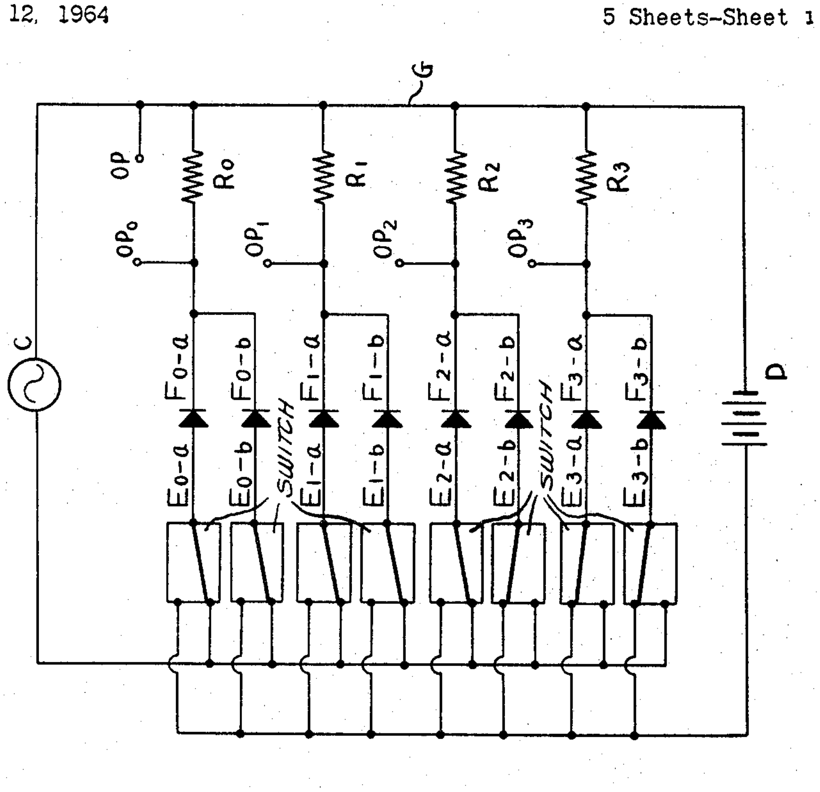

This invention relates to a signal selection system for use in code translation apparatus on facsimile equipment.

The primary object of this invention is to provide a new and improved system for signal selection characterized by the formation of a DC closed circuit in those output resistors which are not applicable to signal selection thereby blocking undesirable outputs from appearing on the output terminals of said resistors with the result that the signal information appears on selected ones of the output resistors. This circuit arrangement permits the use of relatively low efficiency diodes to accomplish the desired signal selection.

For a better understanding of the present invention, together with other and further objects thereof reference is had to the following description taken in connection with the accompanying drawings, while its scope will be pointed out in the appended claims.

Figure 1:
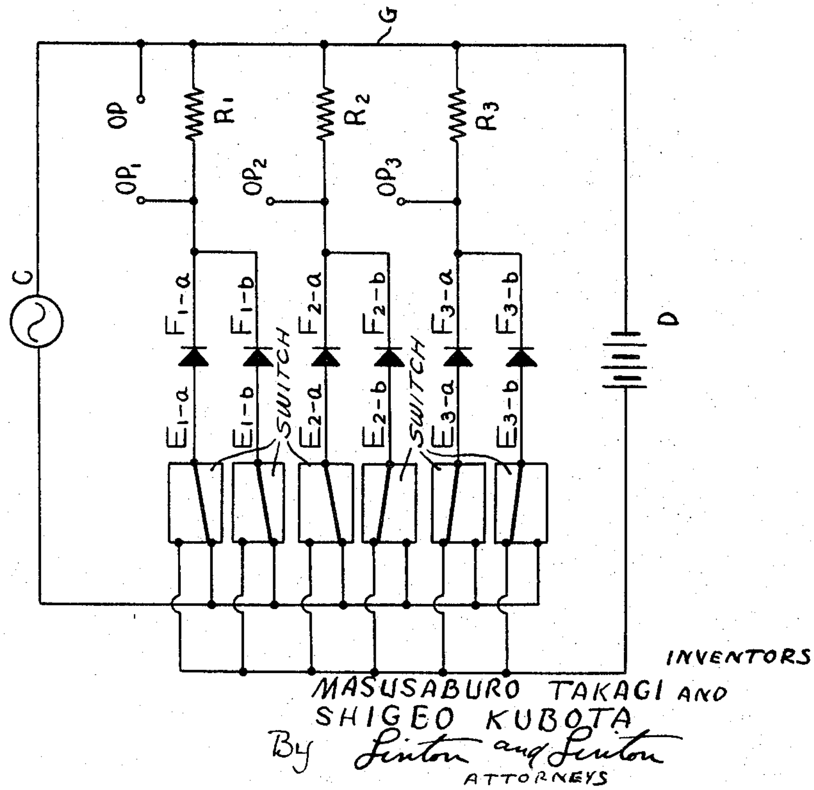
Figure 4:
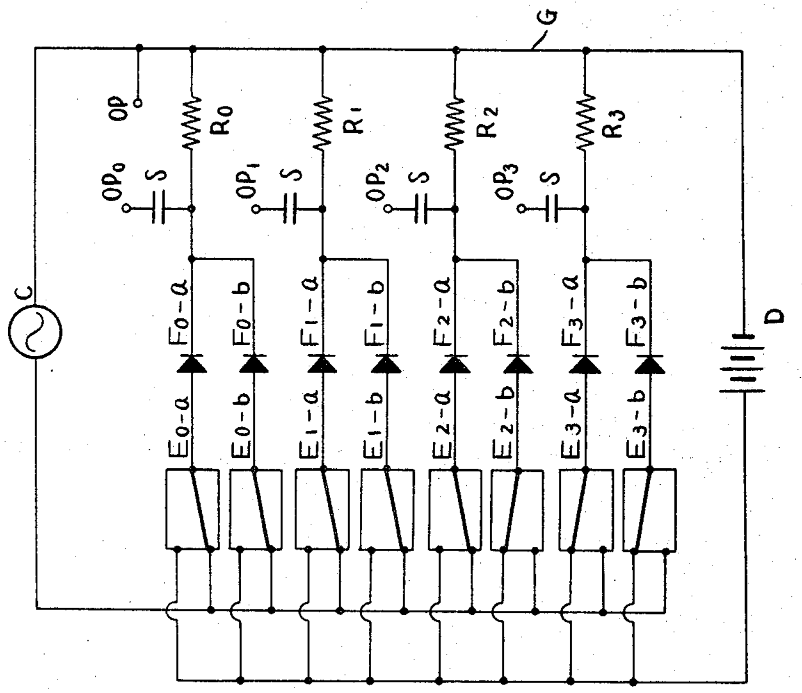
Figure 5:
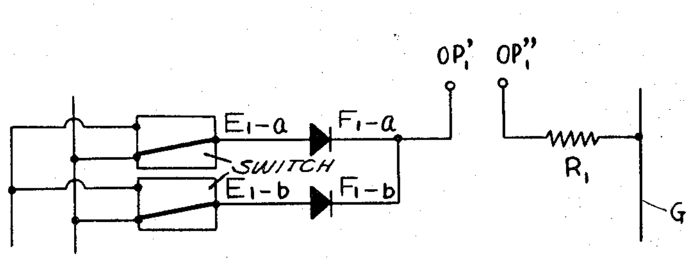
Figure 6:
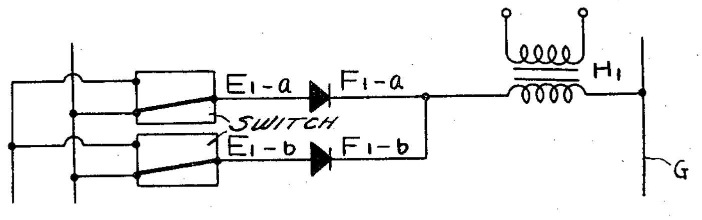
Figure 7:
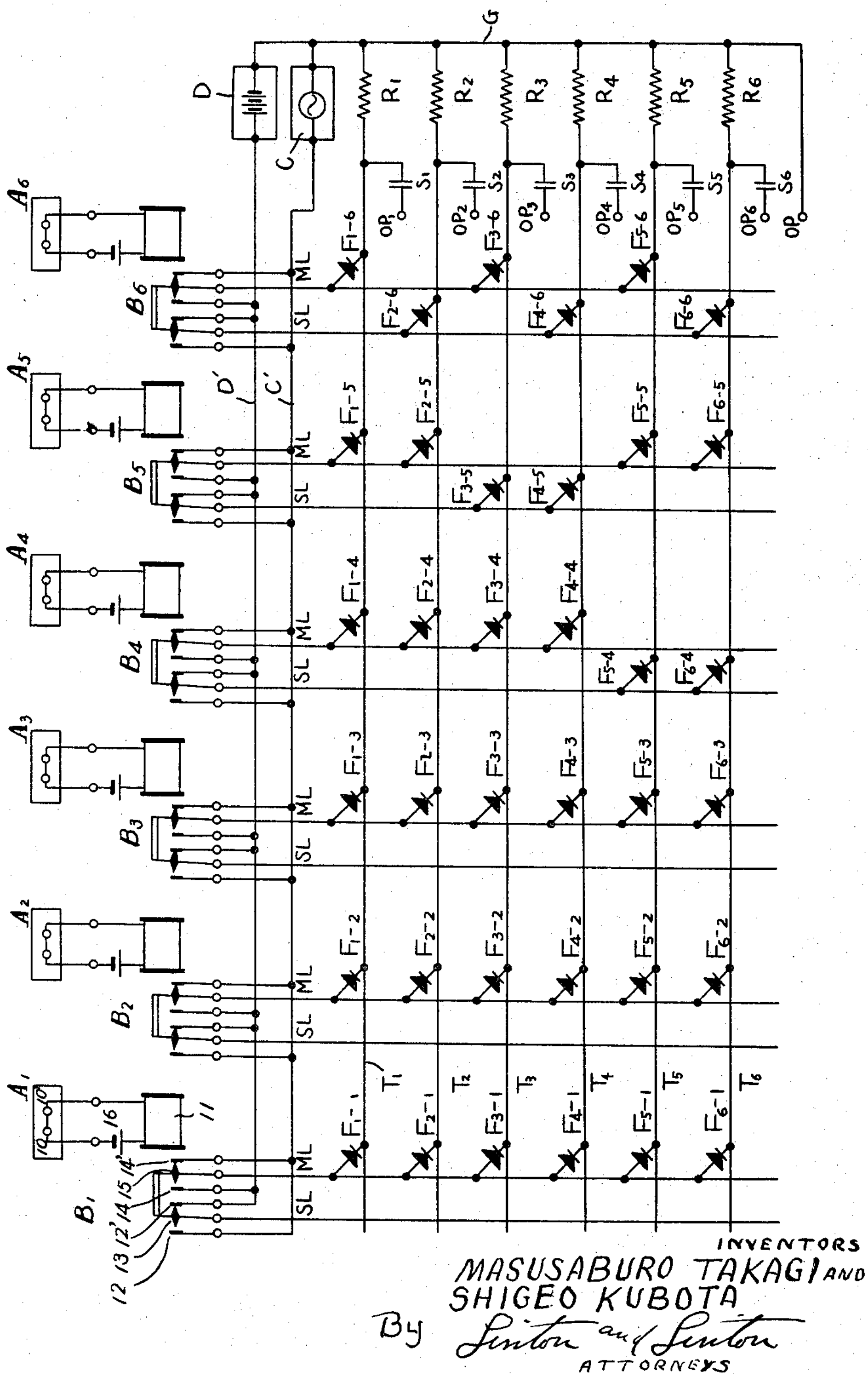
Figure 8:
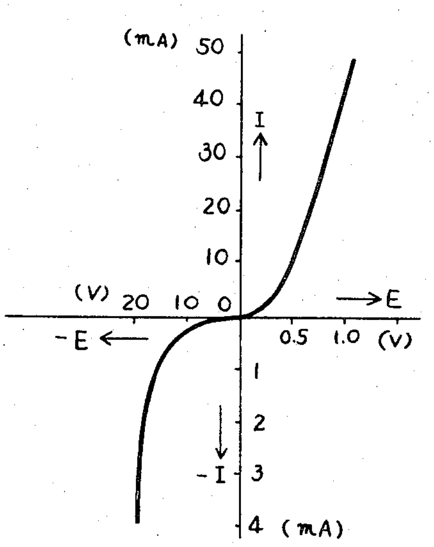
Figure 9:
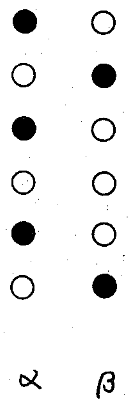

In the drawings:

FIG. 1 is a basic circuit layout of an embodiment of the present invention;

FIGS. 2 through 6, inclusive, are modifications of the circuit of FIG. 1, FIGS. 5 and 6, respectively, illustrating an extract of an individual selection circuit;

FIG. 7 is a more specific circuit arrangement of FIG. 1;

FIG. 8 graphically displays the static characteristics of the diodes used in the signal selection system embodying the present invention;

FIG. 9 illustrates a typical example of codes to be translated.

Reference to FIG. 1 illustrating a basic form of the invention shows the signal selection system as comprising an AC signal source C, a DC power source D, output resistors $R_1$, $R_2$ and $R_3$ substantially equal in resistance value and having one end thereof connected with a common line G connecting the negative poles of the source C and source D, output terminals $OP_1$, $OP_2$ and $OP_3$ coming from one end of the corresponding output resistors $R_1$, $R_2$ and $R_3$, a common terminal OP branching off the common line G, diodes $F_1$–*a*, $F_1$–*b*, $F_2$–*a*, $F_2$–*b*, $F_3$–*a* and $F_3$–*b* substantially identical in characteristics, where $F_1$–*a* and $F_1$–*b*, $F_2$–*a* and $F_2$–*b*, and $F_3$–*a* and $F_3$–*b* are respectively grouped together and connected across the poles of one of the diode groups in common to the other terminals of the output resistors $R_1$, $R_2$ and $R_3$, the other poles of said one of the diode groups being connected across punch-code operated or key-operated switches $E_1$–*a*, $E_1$–*b*, $E_2$–*a*, $E_2$–*b*, $E_3$–*a* and $E_3$–*b* to the positive poles of the AC signal source C and the DC power source D. As shown, the diodes $F_1$–*a*, $F_1$–*b* and $F_2$–*a* are connected to the AC signal source C while the diodes $F_2$–*b*, $F_3$–*a* and $F_3$–*b* are connected to the DC power source D.

Since the diodes $F_1$–*a* and $F_1$–*b* are similarly connected to the AC signal source C, the AC signal emerge upon both ends of the output registor $R_1$. To the output resistors 2 are connected in parallel a series circuit formed of the diode $F_2$–*a* and the AC signal source C and a series circuit formed of the diode $F_2$–*b* and the DC power source D. The DC power source D comprises a battery unit having a relatively low internal resistance and having a voltage selected in accordance with the forward characteristic and output resistance of the diode used. If the output resistor $R_2$ has a resistance substantially greater than the resistance of the series circuit of the diode $F_2$–*b* and the DC power source D, the DC closed circuit turns into a nearly short-circuited state with respect to the output resistor $R_2$ when a direct current from the DC power source D flows through the circuit, thereby prohibiting the emergence of an AC signal upon the ends of the output resistor $R_2$ even with the AC signal applied thereto across the diode $F_2$–*a*.

Turning to the output resistor $R_3$, the AC signal is also blocked from appearing upon the ends thereof because the diodes $F_3$–*a* and $F_3$–*b* connected therewith are connected to the DC power source D.

It may be noted in the above diode circuit arrangement that a negative bias is applied to the diode $F_2$–*a* while a small proportion of positive bias is applied across the diode $F_2$–*a* to the diodes $F_1$–*a* and $F_1$–*b* depending upon the reverse characteristic of the diodes involved and the circuit parameters employed, thereby increasing the signal ratio of the AC signal output appearing at both ends of the output resistor $R_1$ to the outputs at both ends of the other output resistors $R_2$ and $R_3$. This affords better results in the signal selection contemplated.

Thus, in accordance with the present invention, the signal selection system illustrated in FIG. 1 is so contrived that the AC signal appears only upon those selected ones of the grouped output resistors and is blocked from emerging upon the other output resistors by the DC closed circuit formed therewith. The signal ratio may be readily set at a desired value by properly selecting the DC power voltage, output resistance, output impedance, AC signal frequency and output level in accordance with the diode characteristics. Another advantage of the present invention is that the circuit permits the use of such diodes which have irregularities in the forward and reverse characteristics where it is not required to provide significant increase in the signal ratio of a selective AC signal output to a non-selective AC signal output.

It may be further noted of the features of the circuit arrangement according to the present invention that it is possible to exchange the diode $F_2$–*a* with the diode $F_2$–*b* with equal effect or to reverse the polarity of each of the diodes by simply modifying the connections with polarity of the DC power source D similarly reversed.

Further circuit features according to the present invention include the feasibility of switching the polarity of the diodes connecting with the AC signal source C and the DC power source D by means of the switches E which may be operated either mechanically or electrically by the punched code of FIG. 1 or by keys. In other words, it is possible to connect the diodes $F_2$–*a* and $F_2$–*b* coupled to the output resistor $R_2$ with the AC signal source C and at least one of the diode pairs $F_1$–*a*/$F_1$–*b* and $F_3$–*a*/$F_3$–*b* coupled to the respective resistors $R_1$ and $R_3$ with the AC power source D, thereby obtaining the signal information output from the output terminal $OP_2$. Similarly, the diodes $F_3$–*a* and $F_3$–*b* coupled to the output resistor $R_3$ may be connected with the AC signal source C and at least one of the diode pairs $F_1$–*a*/$F_1$–*b* and $F_2$–*a*/$F_2$–*b* coupled t othe respective output resistors $R_1$ and $R_2$ with the DC power source D, thereby obtaining the signal information output from the output terminal $OP_3$.

Figure 3:
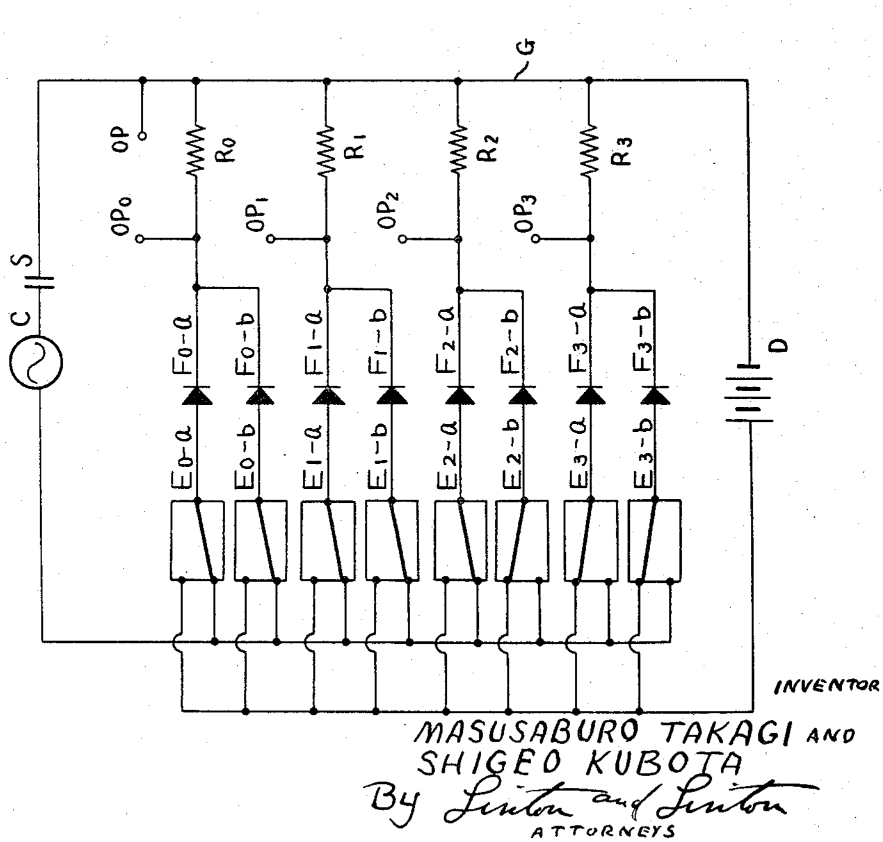

Having described the basic function of the circuit network illustrated in FIG. 1, this basic circuit concept may be developed so as to make the invention more specifically understood. For instance, a circuit consisting of an output resistor RO, a pair of diodes $F_0$–*a*, $F_0$–*b* and a pair of switches $E_0$–*a*, $E_0$–*b* may be connected, as illustrated in FIG. 2, in parallel with the circuit consisting of an output resistor $R_1$, a pair of diodes $F_1$–*a*, $F_1$–*b*, and a pair of switches $E_1$–*a*, $E_1$–*b* in just the same way as the latter is connected with a similar circuit in the whole circuit network, with the result that the AC signal appears only upon the output resistors $R_0$ and $R_1$ while it is substantially blocked from emerging upon the other output resistors $R_2$ and $R_3$. A plurality of such signal selective circuits may be formed similarly in a building-block fashion to accomplish the desired signal selection. Where it is objectionable to permit the flow of direct current with respect to the AC signal source C of FIG. 1, a condenser S may be connected in series therewith as illustrated in FIG. 3.

It is obvious that depending upon the type of a storage unit which follows in the subsequent stage of the system, the condenser S may be connected with one end of each output resistor and an output terminal may be connected across the condenser S as illustrated in FIG. 4. It is further obvious that in the case where a DC closed circuit is formed as input ot the subsequent stage of the circuit device of the present invention, there may be connected output terminals OP′1 and OP″1 in series with the output resistors as illustrated in FIG. 6 (which refers to a single selection circuit but the same may apply to the rest of the circuits).

It is still further obvious that there may be connected a suitable pickup circuit such as transformer $H_1$ in place of the output resistor as shown in FIG. 6, in which the primary winding of the transformer $H_1$ may be made to correspond to the output resistor while the secondary winding is used as an output terminal (this circuit concept is illustrated as applied to only one selection circuit but may be similarly applied to the rest of the circuits shown in FIG. 1).

FIG. 7 illustrates a circuit arrangement embodying the present invention in a further developed form where the number of the selective outputs is increased. This circuit operation will be fully described hereinafter so that the inventive concept of the present invention may be more fully appreciated.

The circuit arrangement according to the present invention is illustrated as comprising tape reading units $A_1$ through $A_6$, inclusive, and signal selection stages corresponding to a 6-unit code information, the tape reading units operating in response to the mark codes (represented by the "●" mark in FIG. 9) and the space codes (represented by the "○" mark in FIG. 9) that are arranged on a punch tape. The tape readers $A_1$–$A_6$ are provided with contacts 10 and 10′ adapted to close upon reading of the mark codes and open upon reading of the space marks. Between these contacts are connected an excitation coil 11 and an excitation power source 16 in series, the excitation coil 11 being adapted to energize twin circuit relays $B_1$ through $B_6$, inclusive, in each tape reading unit.

In the twin circuit relays $B_1$–$B_6$, there are provided fixed contacts 12, and 12′ and a moving contact 13 on the space side of the circuit and fixed contacts 14 and 14′ and a moving contact 15 on the mark side of the circuit. Let it be assumed that the tape readers $A_1$–$A_6$ have read the mark codes on the punched tape. This is when the contacts close to allow the flow of current through the excitation coil 11 thereby causing the moving contacts 13 and 15 to contact with the fixed contacts 12′ and 14′. Conversely, when the tape readers have read the space mark on the punched tape the contacts thereof open, thereby causing the moving contacts 13 and 15 to come into contact with the other fixed contacts 12 and 14. Designated at SL and ML are the space output lead and the mark output lead, respectively, which connect with the corresponding moving contacts 13 and 15 of the twin circuit relays. Designated at D is a direct current source connected with the DC power supply line D′ connecting with the fixed contacts 12′ and 14 of each twin circuit relay. Designated at C is an alternating current source connected with the AC supply line C′ connecting with the fixed contacts 12 and 14′ of each twin circuit relay. Both DC and AC power sources D and C are connected at their respective single pole across a common lead G to a common output terminal OP. Designated at $R_1$ through $R_6$, inclusive, are output resistors of similar resistance value connecting at one end thereof with the common lead G and at the other ends with corresponding tie lines $T_1$ through $T_6$ adapted to couple similar pole strips of diodes. The other pole strips of these diodes are connected with the mark output lead ML or the space output lead SL, as the case may be. These diodes are represented by $F_1$–1 through $F_1$–6, inclusive, $F_2$–1 through $F_2$–6, inclusive, $F_3$–1 through $F_3$–6, inclusive, $F_4$–1 through $F_4$–6, inclusive, $F_5$–1 through $F_5$–6, inclusive, and $F_6$–1 through $F_6$–6, inclusive. Designated at $OP_1$ through $OP_6$, inclusive, are the output terminals connecting across condensers $S_1$ through $S_6$, inclusive, with one ends of the correspond output resistors $R_1$ through $R_6$, inclusive. For purposes of illustration, the embodiment of the present invention is illustrated in FIG. 6 as applicable to a 6-unit code circuit. If the present invention is to be applied to a 6-unit binary code system it will require a total of sixty four different modes of signal selection, in which case the number of output resistors required is sixty four and that of diodes is three hundred eighty four ($64 \times 6 = 384$).

Referring back to FIG. 7, let it be assumed that the circuit contacts in each tape reader are closed; i.e., all 6-unit codes to be read from the punched tape are occupied by the mark codes, in which case the excitation coil 11 of each of the excitation relays $B_1$–$B_6$ is energized. The moving contacts 13 and 15 contact with the fixed contacts 12′ and 14′ with the result that a direct current flows through the space output lead SL while an alternating current signal is applied to the mark output lead ML.

As may be understood from the circuit arrangement of FIG. 7, since the diodes $F_1$–1 through $F_1$–6 connected with the tie line $T_1$ are all connected with the mark output lead ML on which the AC signal is supplied, this signal is applied to the output resistor $R_1$ so that there is obtained a selective AC signal output at the output terminals $OP_1$ and OP across the condenser $S_1$. For instance, if the mark code is assigned to "1" and the space code to "0," the result is that the code information represented by "1,1,1,1,1,1" has been selected at between the output terminals $OP_1$ and OP. In this instance, the diodes $F_2$–1 through $F_2$–5 connected with the tie line $T_2$ are further connected with the space output lead SL thereby forming a DC closed circuit with the output resistor $R_2$ with the result that the AC signal on the output resistor $R_2$ is substantially blocked from appearing at between the output terminals $OP_2$ and OP.

The diode $F_3$–5 among those diodes connected with the tie line $T_3$; the diodes $F_4$–5 and $F_4$–6 among those diodes connected with the tie line $T_4$; the diode $F_5$–4 among those diodes connected with the tie line $T_5$, and the diodes $F_6$–4 and $F_6$–6 among those diodes connected with the tie line $T_6$ are connected respectively with the space output lead SL connecting with the DC power source D, thereby forming a DC closed circuit in each of their associated output resistors $R_3$, $R_4$, $R_5$ and $R_6$. Such DC closed circuits prohibit the emergence of an AC signal output each at between the output terminals $OP_3$ and OP; between $OP_4$ and OP; between $OP_5$ and OP, and between $OP_6$ and OP.

Consequently, the only output terminal that derives the AC code information consisting of "1,1,1,1,1,1" for signal selection is the output terminal $OP_1$, while all of the other output terminals are rendered inoperative for the signal selection.

Now, as the punched tape moves on to a predetermined point at each of the tape readers where a code array consisting of "1,1,1,1,1,0" is read from the tape, the tape readers $A_1$ through $A_5$, inclusive, continue to maintain their initial states but the tape reader $A_6$ alone is caused to open its contacts thereby cutting off the flow of current through the excitation coil 11 of the relay $B_6$ and thereby switching the moving contacts 13 and 15 over to the fixed contacts 12 and 14, at which position the space output lead SL is supplied with AC signal and the mark output lead ML with direct current. As a result, the AC signal information appears at between the output terminals $OP_1$ and OP across condenser $S_2$ because the diodes $F_2$–1 through $F_2$–6, inclusive, connecting with the tie line 2 are now all impressed with the AC signals and hence, no DC closed circuit is formed in their output resistor $R_2$. In such circuit state of the device according to the present invention, all of the diodes connecting with the tie lines $T_1$, $T_3$ and $T_4$ other than $T_2$ are always connected with the DC power source so that a DC closed circuit is formed with respect to each of their output resistors $R_1$, $R_3$, $R_4$, $R_5$ and $R_6$ thereby prohibiting the appearance of a selective AC signal information output each at between the corresponding output terminals $OP_1$ and OP; $OP_3$ and OP; $OP_4$ and OP; $OP_5$ and OP, and $OP_6$ and OP. Therefore, it is the output terminal $OP_2$ alone that functions as a signal selection output terminal for the code information consisting of "1,1,1,1,1,0," whereas all of the other terminals $O_1$, $OP_3$, $OP_4$, $OP_5$ and $OP_6$ are rendered inoperative for the AC signal selection.

The circuit concept of the present invention above discussed may equally apply to the other combinations of code information including "1,1,1,1,0,1" which is carried by the output terminal $OP_3$; "1,1,1,1,0,0" by the output terminal $OP_4$; "1,1,1,0,1,1" by the output terminal $OP_5$, and "1,1,1,0,1,0" by the output terminal $OP_6$, respectively. This concept may be further developed to accomplish a total of sixty four different modes of signal selection for a 6-unit code information.

Thus, in accordance with the present invention, a given 6-unit code information on tape is read by a tape reading unit regardless of the number of stages of tie lines, when all of the diodes connecting with a certain tie line corresponding to that code information are caused to connect with the AC signal source so that the AC signal outputs to be selected may be derived from the output resistors associated with said diodes, while one or more of those diodes connecting with all of the other tie lines are caused to connect with the DC power source thereby forming a DC closed circuit to substantially block the AC selective signal output from appearing at any of the output resistors associated with said diodes.

The circuit components incorporated in the signal selection device according to the present invention are identified as follows, which are presented as a typical example but should not be considered as limiting the invention thereto.

The output resistors $R_1$ through $R_6$, inclusive, are equally 2 kilohms. The diodes $F_1$–1 through $F_6$–6, inclusive, are selenium diodes having a mean static characteristic such as shown in FIG. 8. The condensers $S_1$ through $S_6$, inclusive, though not always required, may be determined by the circuit parameters involved in stages subsequent to the signal selection circuit network of the present invention. The AC signal source C may be one which is capable of supplying a sine wave signal having a frequency of 3 kilohms, an output level of 5 volts and an output impedance of 600 ohms. The DC signal source D is a 6-volt dry cell.

With these circuit components, it was possible to obtain an AC signal ratio of about 40 decibels between the selective signal output terminal and the non-selective signal output terminal. This signal ratio, it has been ascertained, may be further increased by reducing the frequency of the AC signal source or otherwise modifying the circuit parameters. It has also been ascertained that the number of information units as well as the number of signal outputs to be selected may be increased by further developing the basic circuit concept of the present invention as desired, with equally satisfactory results.

Heretofore, such signal selection circuits using a number of diodes for handling AC signals or modulated waves have depended upon a biasing method in which a selective AC signal is obtained with a positive bias applied to the selection circuit or without such positive bias where a negative bias is applied to the non-selecting circuit. This circuit method necessitated the use of diodes which have good reverse characteristics to maintain a good selection circuit operation. Such device is necessarily costly because a large number of such expensive diodes are required.

Whereas, the selection circuit according to the present invention benefits by the utilization of relatively low efficiency, less costly diodes such as for example selenium diodes in that a negative bias is applied to those diodes of the group connecting with the output resistors, which are not in the state of selecting the AC signal, and connecting with the AC signal source, while a positive bias is applied to those diodes connecting with the output resistors which are adapted for the signal selection. It is rendered possible according to the present invention to use such less costly diodes which may have certain irregularities in the performance characteristics without affecting the circuit operation. This permits the manufacture of a desired signal selection device with utmost ease and at minimum cost.

While there has been described what is at present considered to be the preferred embodiment of the present invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A signal selection system comprising an AC signal source, a DC power source, and a plurality of parallel circuits corresponding in number to the output signals and each consisting of switching means, an output element and a number of diodes connected permanently in the same polarity with said output element and switched by the switching means alternately to the DC power source and to the AC signal source, said DC power source being so oriented circuitwise as to apply a positive bias voltage to diodes for blocking the AC output signal, whereby the switching means allows all diodes of a chosen circuit to be switched over to the AC signal source, at least one of the diodes of each of the other circuits to be switched over to the DC power source and its remaining diodes to be switched over to hte AC signal source, so that an AC output signal appears at the output element of said chosen circuit while the resultant closed DC loop formed through each of other circuits will block the emergence of an AC output signal at its output element.

2. A signal selection system according to claim 1, wherein each output element consists of a resistor across which output terminals are provided.

3. A signal selection system according to claim 1, wherein each output element consists of a resistor whose resistance value is set substantially higher than that present in said closed DC loop.

4. A signal selection system according to claim 1, wherein each output element consists of a resistor paralleled by a capacitor, output terminals being provided between said resistor and said capacitor.

5. A signal selection system according to claim 1, wherein a capacitor is provided in series with the AC signal source and each output element consists of a resistor across which output terminals are provided.

6. A signal selection system according to claim 1, wherein each output element consists of a resistor, output terminals being provided in series with said resistor.

7. A signal selection system according to claim 1, wherein each output element consists of a transformer whose primary winding is in series with each diode and whose secondary winding is terminated by output terminals.

8. A signal selection system comprising, in a network form, a plurality of pairs of output leads, one lead of each pair representing the "mark" code and the other the "space" code, the number of said pairs being equal to the number of the input code units, an AC signal source, a DC power source, a plurality of output resistors corresponding in number to the output signals, a plurality of diodes provided for each output resistor and corresponding in number to said input code units, and a switching means provided on each of said output leads, all of said diodes in the network being connected, on the one hand, with one end of the respective output resistor in the same polarity, and on the other hand with the "mark" or "space" leads, whereby the switching by said switching means of all of the diodes of a chosen ouput resistor over to the AC signal source through "mark" leads makes available an AC output signal at said resistor but switches at least one of the diodes of each of the other output resistors over to the DC power source through "space" leads and switches its remaining diodes over to the AC power source so that the resultant closed DC loop formed through the resistor will block the emergence of an AC output signal thereat.

References Cited

UNITED STATES PATENTS

| | | | |
|---|---|---|---|
| 2,570,716 | 10/1951 | Rochester | 340—176 |
| 3,014,202 | 12/1961 | Hanewinkel | 340—176 XR |
| 3,054,985 | 9/1962 | Mason | 340—176 XR |
| 3,308,433 | 3/1967 | Lochinger | 340—176 XR |

JOHN W. CALDWELL, *Primary Examiner.*

D. J. YUSKO, *Assistant Examiner.*